US008813616B2

(12) United States Patent
Hangleiter et al.

(10) Patent No.: US 8,813,616 B2
(45) Date of Patent: Aug. 26, 2014

(54) ELECTRIC-DRIVE STEADY REST

(75) Inventors: Eugen Hangleiter, Hermaringen (DE); Peter Schenk, Niederstotzinger (DE)

(73) Assignee: Roehm GmbH, Sontheim (DE)

( * ) Notice: Subject to any disclaimer, the term of this patent is extended or adjusted under 35 U.S.C. 154(b) by 107 days.

(21) Appl. No.: 13/547,299

(22) Filed: Jul. 12, 2012

(65) Prior Publication Data

US 2013/0014620 A1     Jan. 17, 2013

(30) Foreign Application Priority Data

Jul. 13, 2011   (DE) .......................... 10 2011 051 821

(51) Int. Cl.
*B23Q 1/25*   (2006.01)
*B23Q 1/76*   (2006.01)
*B24B 41/06*  (2012.01)

(52) U.S. Cl.
CPC ...................................... *B23Q 1/76* (2013.01)
USPC ............................................... 82/157; 82/162

(58) Field of Classification Search
USPC ................... 82/157, 162, 164, 70.2; 451/408; 279/133
See application file for complete search history.

(56) References Cited

U.S. PATENT DOCUMENTS

| 4,463,635 | A | * | 8/1984 | Hafla et al. ...................... 82/162 |
| 4,517,866 | A | * | 5/1985 | Bazuin ............................. 82/164 |
| 4,754,673 | A | * | 7/1988 | Hiestand .......................... 82/164 |
| 5,058,468 | A |   | 10/1991 | Lessway |
| 6,505,533 | B2 | * | 1/2003 | Kroisandt ......................... 82/53 |
| 7,597,035 | B2 | * | 10/2009 | Rehm .............................. 82/157 |
| 8,266,992 | B2 | * | 9/2012 | Rehm .............................. 82/157 |
| 2011/0209591 | A1 |   | 9/2011 | Helm et al. |

FOREIGN PATENT DOCUMENTS

DE            8510239.3 G     6/1985

* cited by examiner

*Primary Examiner* — Will Fridie, Jr.
(74) *Attorney, Agent, or Firm* — Andrew Wilford

(57) ABSTRACT

A steady rest has a body juxtposable with a workpiece rotatable about a workpiece axis. Two arm elements are pivoted on the body and carry outer rollers radially engageable with the workpiece. A center element shiftable on the body in a straight line generally radially of the axis carries a center roller engageable radially with the workpiece. The rollers are angularly spaced about the workpiece. An electric actuator mounted on the body is connected by a transmission to the elements for displacing the respective roller radially relative to the workpiece.

14 Claims, 2 Drawing Sheets

ELECTRIC-DRIVE STEADY REST

FIELD OF THE INVENTION

The present invention relates to a steady rest. More particularly this invention concerns a steady rest with an electric drive or actuator.

BACKGROUND OF THE INVENTION

A center rest is typically used to support a long workpiece in a lathe between the headstock and tailstock. It typically has two outer and a center support elements, each having a respective track roller. The rollers all lie in a plane perpendicular the workpiece rotation axis and are rotatable about respective roller axes parallel to, radially equispaced from and generally angularly equispaced about the workpiece rotation axis. The center roller is shiftable in a straight line against the workpiece radially of the workpiece axis. The outer rollers are typically mounted on arms pivoted in axles in a housing of the center rest so that they can move radially of the workpiece center axis, but along arcuate paths centered on the respective axles.

A steady rest of the above-described type that is hydraulically actuated is known from DE 35 44 961 [U.S. Pat. No. 4,754,673]. Care must always be taken that sufficient hydraulic fluid is present in the piston chambers in order to maintain the holding force of the steady rest for holding a cylindrical center portion of the workpiece being turned. Leaks pose a problem for hydraulically actuated steady rests, and result in a loss in holding force.

OBJECTS OF THE INVENTION

It is therefore an object of the present invention to provide an improved steady rest.

Another object is the provision of such an improved steady rest that overcomes the above-given disadvantages, in particular that operates satisfactorily with fewer hydraulic components.

SUMMARY OF THE INVENTION

A steady rest has according to the invention a body juxtaposable with a workpiece rotatable about a workpiece axis. Two arm elements are pivoted on the body and carry outer rollers radially engageable with the workpiece. A center element shiftable on the body in a straight line generally radially of the axis carries a center roller engageable radially with the workpiece. The rollers are angularly spaced about the workpiece. An electric actuator mounted on the body is connected by a transmission to the elements for displacing the respective roller radially relative to the workpiece.

The resultant advantage is that the steady rest may be more compact since it works without a pressure medium chamber and a pressure piston guided therein for displacing the movable support element. Furthermore, the steady rest according to the invention may also be used in automated machining centers that must be supplied with electrical power anyway. The invention thus also provides the user with a way to progressively automate production. The electric motor is operated at the customary low voltage.

Preferably, the center support element is displaceable by a rod actuated by the electric motor. The rod may be the driven component in the force-transmission chain from the electric motor to the outer support elements. Axial rearward displacement of the center support element of the steady rest may thus be carried out by the electric motor.

It has proven to be advantageous for the rod to be displaceable by a linear actuator. In this way, a standardized, and therefore more economical, linear motor may be easily used for the steady rest. In addition, existing steady rests may thus be retrofitted with an electric drive.

It is practical when the rod is a threaded spindle and is displaceable by a nut assembly that is driven by the electric motor. It is therefore not necessary to initially convert the rotary motion of the electric motor into a linear motion in order to displace the rod, since the rod is now independently axially displaced by the screwthreads between the spindle and the nut assembly.

It is also advantageous when the transmission is a planetary transmission that determines the gear ratio and the transmission of the rotational speed. In addition, it ensures the transmission of the required torque.

The nut assembly advantageously has a multipart design preferably formed from a spindle nut, a coupling, and a drive wheel. This multipart design simplifies installation of the steady rest.

If the drive wheel is also constructed as a toothed pulley and is driven by the electric motor via a belt drive, this offers the advantage that the installed length and/or height of the steady rest may be reduced. It is also possible to provide other transmission for converting and transmitting the rotation of the electric motor, for example a gear connection or a chain connection, between the electric motor and the drive wheel.

Another embodiment is characterized in that a controller that controls the electric motor is provided. This facilitates making very fine, precise adjustments of the electric motor by the user of the steady rest. This adjustment of the rotational speed of the electric motor may also be performed in an automated manner by the controller alone.

Within the scope of the invention, it has proven to be particularly preferable to provide a spring between the axially rear face, that is the face turned away from the workpiece, of the nut assembly and the steady rest body. The spring is preferably a stack of spring washers. This spring washer stack is used as a holding force storage mechanism and as a holding force safety device. When in use, the spindle and therefore the support element are moved toward of the workpiece by the electric motor. As soon as the support element contacts the workpiece, the spindle can no longer be moved axially relative to the workpiece. As a result, the axial position of the nut assembly within the steady rest body is moved against the force of the spring. The energy of the electric motor is thus utilized to compress or expand the spring, causing the spring to exert a consistent restoring force on the nut assembly and the spindle, and thus on the element that holds the workpiece.

It is also advantageous when a force sensor is provided that is preferably provided between the spring and the nut assembly. After an evaluation of the spring characteristic curve data, it is thus possible to draw direct conclusions concerning the action of the holding force. Various force sensors may be used. A force-measuring washer is particularly preferred.

It is also advantageous when a spacer disk having a distance indicator is provided between the nut assembly and the spring. The change in length of the spring that occurs when the spring is compressed or extended may thus be detected. It has proven to be particularly advantageous to provide a distance sensor that is able to measure the changing distance from the distance indicator.

Within the scope of the invention, it has been shown to be particularly preferred for the controller to have a communication connection with the force sensor and/or the distance sensor. Based on the evaluation of the spring characteristic curve data, the electric motor may now be controlled by the controller in a force-dependent manner. It has been shown that the design of the steady rest according to the invention with control of the electric motor in a force-dependent manner, based on the evaluation of the distance sensor data, is very cost-effective and therefore particularly preferred.

To keep the installed length of the steady rest small, it has proven to be advantageous for the electric motor to be oriented parallel to the longitudinal axis of the steady rest.

Last, it is also practical when the two outer support elements are displaceable by the rod. This may be easily achieved by a radial cam provided on the rod that cooperates with control elements provided on the tensioning arms.

BRIEF DESCRIPTION OF THE DRAWING

The above and other objects, features, and advantages will become more readily apparent from the following description, reference being made to the accompanying drawing in which.

DETAILED DESCRIPTION

Figure 1:
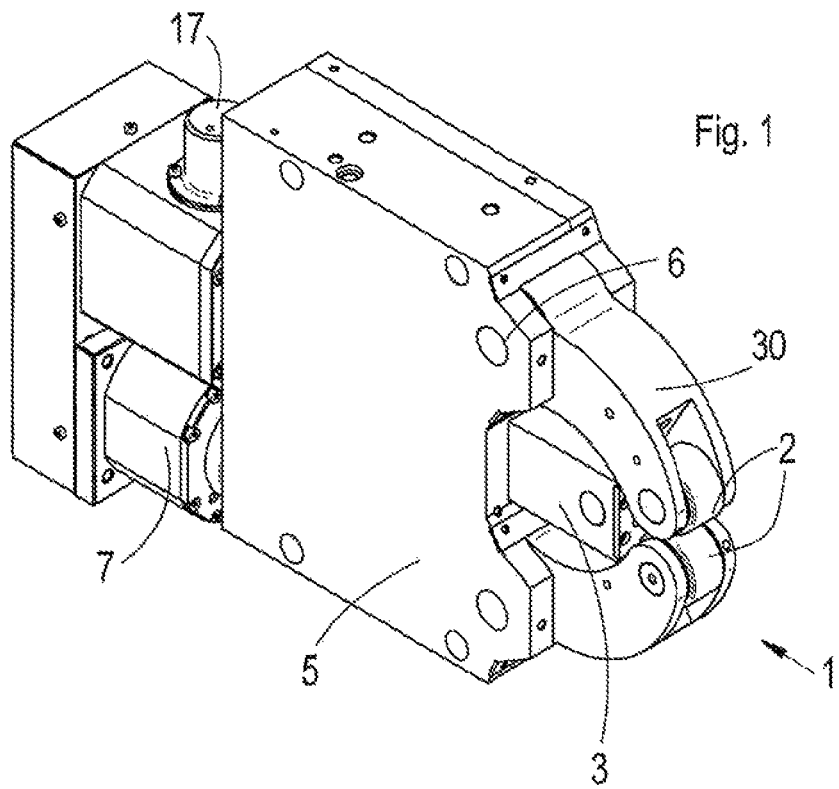
FIG. 1 is a perspective view of the steady rest according to the invention.
Figure 2:
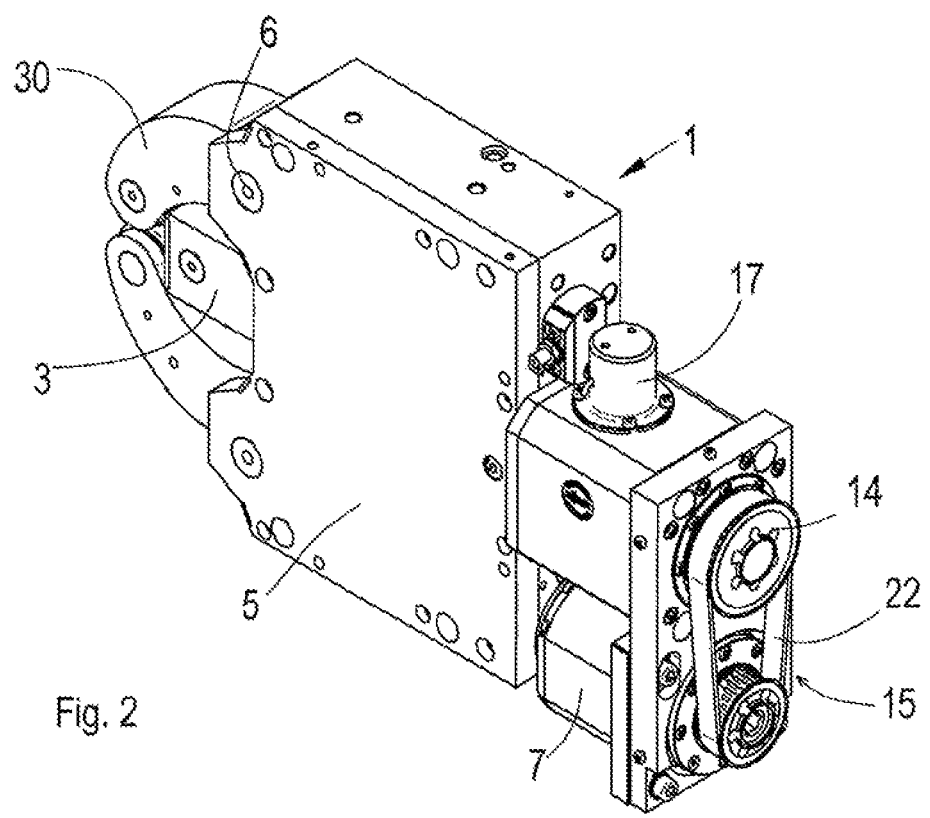
FIG. 2 shows the steady rest from FIG. 1 without a drive cover.
Figure 3:
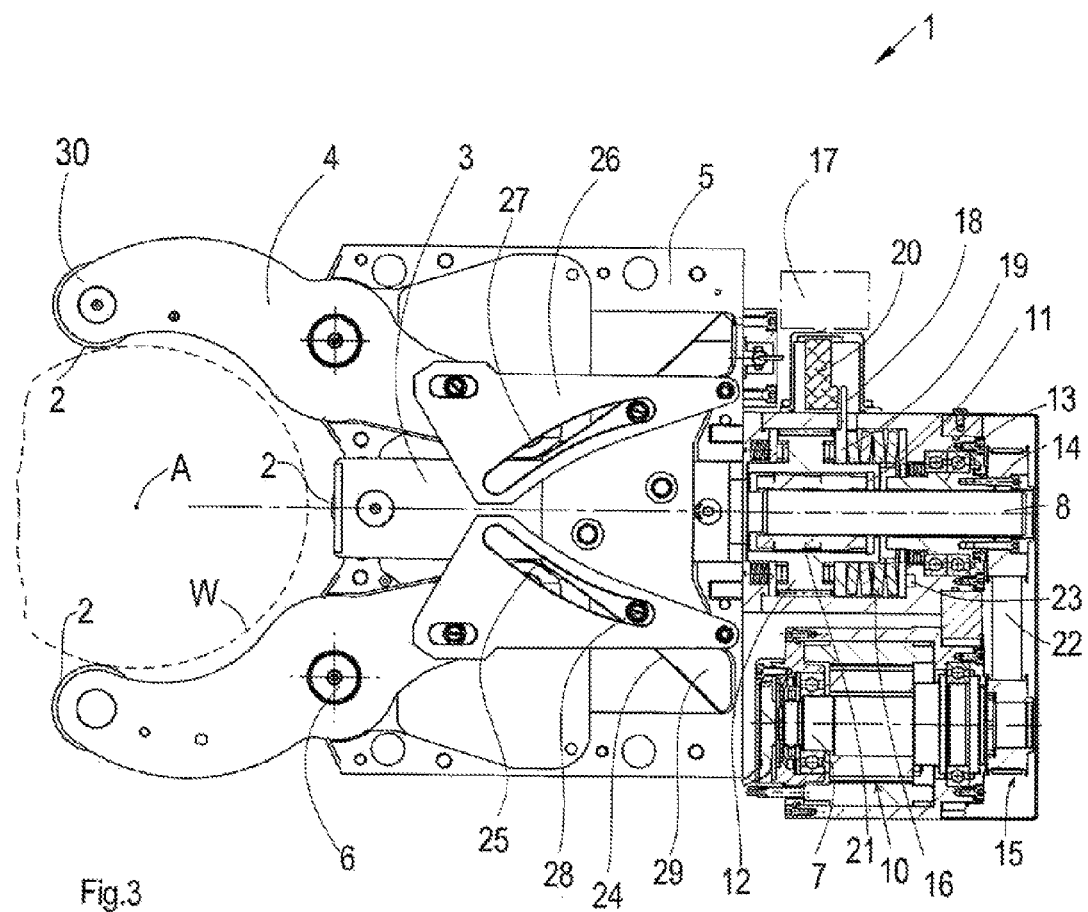
FIG. 3 is a longitudinal section of the steady rest from FIG. 1.

As seen in FIG. 1 a steady rest 1 serves for holding the center of a workpiece W extending along and rotated by a lathe about a normally horizontal axis A. The steady rest 1 has a body 3 carrying three support elements 3, 30 each carrying a respective track roller 2 that all lie in a plane perpendicular to the axis A and that each is rotatable about a respective roller axis parallel to the axis A, with the roller axes normally angularly equispaced about the axis A. The two outer support elements 30 are two-arm levers 4 pivotal on respective axles 6 in the steady rest body 5 and extending parallel to the axis A. The center support element 3 is displaceable in a straight line radially relative to the workpiece W. According to the invention, at least one of the support elements 3, 30 is displaceable by an electric actuator or motor 7.

In the illustrated embodiment, the center support element 3 is displaceable by a rod 8 that is formed as a spindle 9. The rod 8 is displaceable by a nut assembly 10 that is driven by the electric motor 7 and that has a multipart design formed by a spindle nut 12, a coupling 13, and a drive wheel 14.

A transmission 11, here a planetary transmission having rollers 21, is provided between the spindle nut 12 and the spindle 9.

The drive wheel 14 is a toothed pulley and is driven by the electric motor 7 via a toothed belt 22. The electric motor 7 has an output shaft extending on an axis parallel to the longitudinal axis of the steady rest.

In addition, a spring 16 is mounted between the axially rear face of the spindle nut 12 and the steady rest body 5, the spring being constructed as a stack of spring washers 23.

A controller 17 that controls the electric motor 7 is connected to a distance sensor 20. This distance sensor 20 measures the spacing from an indicator 18 provided on a spacer disk 19 axially coupled to the nut 12. The electric motor 7 is offset from the longitudinal axis of the steady rest, and the spacer disk 19 is provided between the spindle nut 12 and the spring 16 so as to move axially with the nut 12.

A force sensor 23 is provided between the spring 16 and the body 5 to supply the controller 17 and output corresponding to the amount of force the roller 2 of the element 3 is applying to the workpiece W.

In the embodiment shown, the outer two support elements 30 are also displaceable by the rod 8. For this purpose the rod 8 has a cam 24, and the tensioning arms 4 have control elements 26 that move radially with the 24. Thus the cam 24 can push the rear arms of the levers 4 apart to bring their front arms carrying the respective rollers 2 radially together, and the elements 25 can, on retraction of the rod 8, pull these rear arms together via cam edges 25 to spread the respective rollers 2.

To release the tension, restoring levers 26 are provided that have guides 27 in which restoring members 28 are guided. The radial cam 24 may be formed by a control element 29 that is connected to the rod 8, and to which the restoring members 28 are fastened.

We claim:

1. A steady rest comprising:
a body juxtposable with a workpiece rotatable about a workpiece axis;
two arm elements pivoted on the body and carrying outer rollers radially engageable with the workpiece;
a center rod centered on a rod axis extending generally radially of the workpiece, shiftable on the body axially of the rod axis, and carrying a center roller engageable radially with the workpiece, the rollers being angularly spaced about the workpiece;
an electric motor mounted on the body and having a rotary output; and
transmission means on the body coupled between the rod and the rotary output of the motor for displacing the center roller radially relative to the workpiece axis and axially of the rod axis.

2. The steady rest defined in claim 1, wherein the rollers all lie in a plane substantially perpendicular to the workpiece axis and are rotatable about respective axes that are substantially parallel to the workpiece axis.

3. The steady rest defined in claim 1, wherein the transmission means is a planetary transmission.

4. The steady rest defined in claim 3, wherein the rod is a threaded spindle and the transmission means includes a nut threaded on the spindle and connected to the motor.

5. The steady rest defined in claim 4, wherein the transmission means further includes a coupling and a drive wheel connected between the motor and the nut.

6. The steady rest defined in claim 4, wherein the motor output rotates about an axis parallel to the rod axis and the transmission means further includes a belt connected between the output and the drive wheel.

7. The steady rest defined in claim 1, further comprising:
a controller connected to the motor for operating same.

8. A steady rest comprising:
a body juxtposable with a workpiece rotatable about a workpiece axis;
two arm elements pivoted on the body and carrying outer rollers radially engageable with the workpiece;
a center rod centered on a rod axis extending generally radially of the workpiece, shiftable on the body axially of the rod axis, and carrying a center roller engageable radially with the workpiece, the rollers being angularly spaced about the workpiece;
an electric actuator mounted on the body;

transmission means on the body coupled between one of the elements and the actuator for displacing the respective roller radially relative to the workpiece axis and axially of the rod axis;

a controller connected to the actuator for operating same; and a spring braced axially between the rod and the body and urging the rod toward the workpiece axis.

9. The steady rest defined in claim 8, further comprising a sensor between the body and the rod for detecting a force the spring is exerting axially of the rod axis on the rod and for feeding an output corresponding thereto to the controller.

10. The steady rest defined in claim 8, wherein the spring is formed by a stack of spring washers.

11. A steady rest comprising:
a body juxtposable with a workpiece rotatable about a workpiece axis;
two arm elements pivoted on the body and carrying outer rollers radially engageable with the workpiece;
a center rod centered on a rod axis extending generally radially of the workpiece, shiftable on the body axially of the rod axis, and carrying a center roller engageable radially with the workpiece, the rollers being angularly spaced about the workpiece;
an electric actuator mounted on the body;
transmission means on the body coupled between one of the elements and the actuator for displacing the respective roller radially relative to the workpiece axis and axially of the rod axis;
a controller connected to the motor for operating same; and
an indicator coupled axially to the rod and axially shiftable therewith.

12. The steady rest defined in claim 11, further comprising:
a sensor element on the body juxtaposed with the indicator for detecting the position thereof and feeding an output corresponding thereto to the controller.

13. The steady rest defined in claim 1, further comprising:
structure engaged between the rod and the arms for pivoting the arms on shifting of the rod along the rod axis.

14. The steady rest defined in claim 13 wherein the structure is a cam on the rod.

* * * * *